(12) United States Patent
Shershevsky et al.

(10) Patent No.: US 10,599,750 B2
(45) Date of Patent: Mar. 24, 2020

(54) CAPTURING AN APPLICATION STATE IN A CONVERSATION

(71) Applicant: ENTIT SOFTWARE LLC, Sunnyvale, CA (US)

(72) Inventors: Olga Shershevsky, Yehud (IL); Efrat Arvats, Yehud (IL); Kobi Eisenberg, Sunnyvale, CO (US)

(73) Assignee: MICRO FOCUS LLC, Santa Clara, CA (US)

( * ) Notice: Subject to any disclaimer, the term of this patent is extended or adjusted under 35 U.S.C. 154(b) by 536 days.

(21) Appl. No.: 14/417,950

(22) PCT Filed: Sep. 27, 2012

(86) PCT No.: PCT/US2012/057446
§ 371 (c)(1),
(2) Date: Jan. 28, 2015

(87) PCT Pub. No.: WO2014/051578
PCT Pub. Date: Apr. 3, 2014

(65) Prior Publication Data
US 2015/0205770 A1    Jul. 23, 2015

(51) Int. Cl.
*G06F 3/00* (2006.01)
*G06F 17/22* (2006.01)
*G06Q 10/10* (2012.01)
*G06F 3/0481* (2013.01)
*G06F 8/71* (2018.01)
*G06F 3/0482* (2013.01)
*G06F 3/0484* (2013.01)
*H04L 12/58* (2006.01)
*H04L 29/06* (2006.01)

(52) U.S. Cl.
CPC ........ *G06F 17/2247* (2013.01); *G06F 3/0481* (2013.01); *G06F 3/0482* (2013.01); *G06F 3/04842* (2013.01); *G06F 8/71* (2013.01); *G06Q 10/10* (2013.01); *H04L 51/10* (2013.01); *H04L 65/403* (2013.01)

(58) Field of Classification Search
CPC ... G06F 17/2247; G06F 3/0481; G06F 3/0482
See application file for complete search history.

(56) References Cited

U.S. PATENT DOCUMENTS

2004/0177116 A1    9/2004    McConn et al.
2004/0228531 A1    11/2004   Fernandez et al.
(Continued)

OTHER PUBLICATIONS

Korean Intellectual Property Office, International Search Report and Written Opinion, Apr. 30, 2013, 9 pages, KIPO, Daejeon Metropolitan City, Republic of Korea.

*Primary Examiner* — Stephen S Hong
*Assistant Examiner* — Marshon L Robinson

(57) ABSTRACT

The state of an application is capture in a conversation by accessing an electronic document representation of a user interface at a time corresponding to a post to the conversation. The user interface is of an application associated with the conversation. The representation is processed to generate an image representative of a state of the application at the time. The image or a representation thereof is caused to be displayed in the post to reflect the state of the application at selected point along a timeline defined by the conversation.

17 Claims, 6 Drawing Sheets

(56) References Cited

U.S. PATENT DOCUMENTS

| | | |
|---|---|---|
| 2005/0021624 A1 | 1/2005 | Herf et al. |
| 2005/0193055 A1* | 9/2005 | Angel .................... G06Q 30/02 709/202 |
| 2007/0113196 A1* | 5/2007 | Wang .................... G06F 3/0483 715/781 |
| 2009/0055748 A1* | 2/2009 | Dieberger .............. G06Q 10/00 715/735 |
| 2009/0259937 A1 | 10/2009 | Rohall et al. |
| 2009/0300125 A1* | 12/2009 | Wang .................... H04L 51/066 709/206 |
| 2010/0138756 A1 | 6/2010 | Saund et al. |
| 2012/0173997 A1 | 7/2012 | Schwerdtfeger et al. |
| 2012/0216146 A1* | 8/2012 | Korkonen ........... G06F 3/04817 715/835 |

\* cited by examiner

CAPTURING AN APPLICATION STATE IN A CONVERSATION

BACKGROUND

Tools such as e-mail and chat enable participants to engage in conversations and collaborate on given topics. The context of such conversations is discerned by the participants reading the conversation. Initially, the context may be defined by a subject line. As an e-mail or chat thread grows with static files being added as attachments, the current topic of discussion can change over time. As a result, new and existing participants can find it cumbersome to discern the current context making it more difficult to take actions called for by the conversation.

DRAWINGS

DETAILED DESCRIPTION

Introduction

Figure 1:
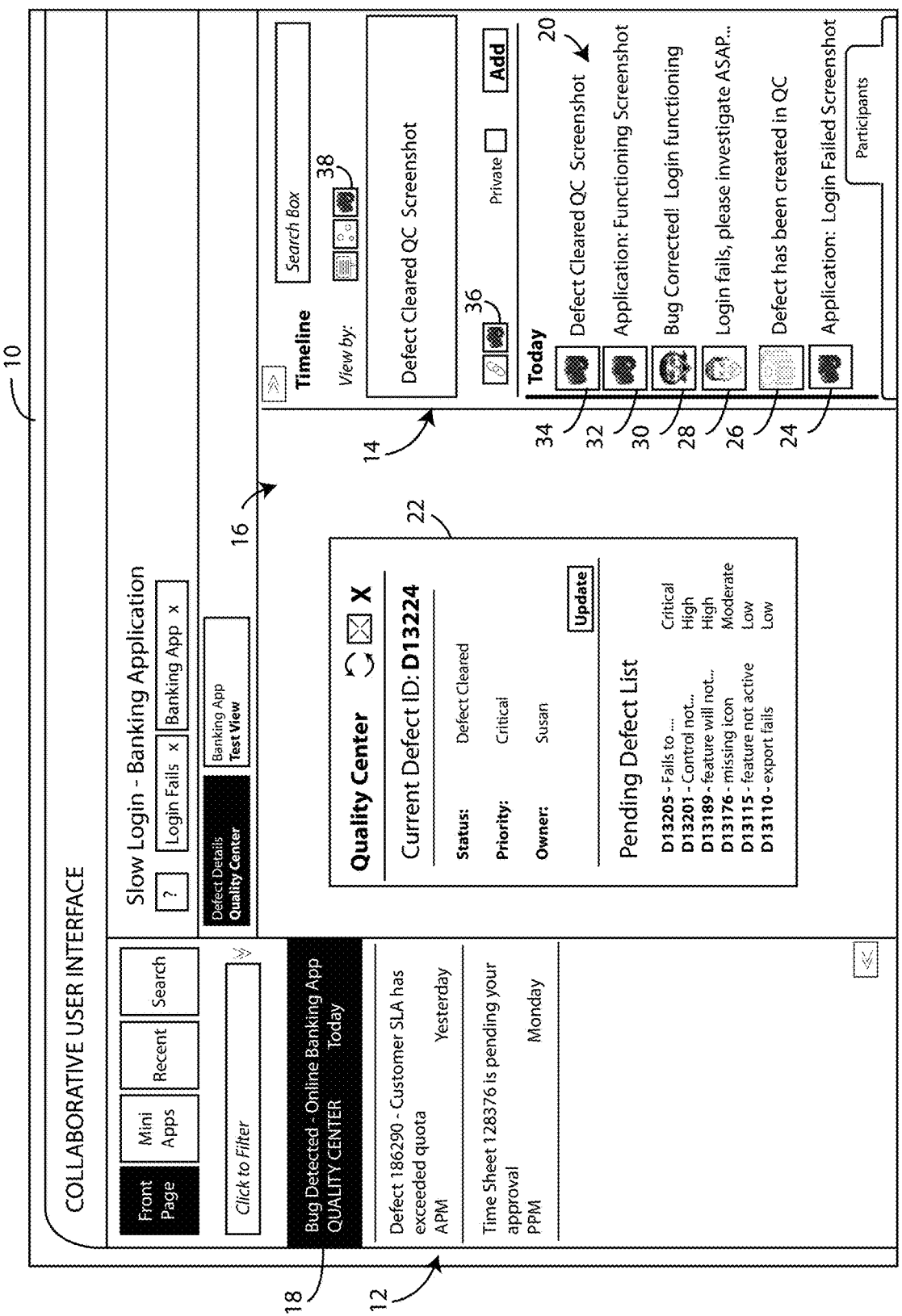
FIGS. 1-4 depict screen views of a user interface displaying a conversation where the state of an application is captured in the conversation according to examples.

It is often the case that enterprise software applications, especially in IT organizations, are complex. The applications can require significant training and know how in order for a user to extract relevant information or perform specific actions of a given work flow. The information that a user consumes and the actions that are performed are often dynamic and defined by the context of that work flow. Before an action is taken, a user may collaborate with others to obtain perspective, guidance, or even permission. Conventionally, users, when faced with action items in a conversation, access and manipulate information in applications other than the tool used to collaborate.

Various embodiments described below enable collaboration participants to consume the relevant application information from within a collaboration tool. As described in more detail below, this relevant information includes the states of the application or applications that are the subject of the conversation. A conversation, as used herein, is an electronic interaction between participants concerning an evolving topic in the context of an application. Each participant can be presented with collaboration content that includes a conversation timeline made up of posts of the various participants.

An example of capturing an application state in a conversation includes, at a time corresponding to a post to the conversation, accessing an electronic document representation of a user interface of an application associated with the conversation. The electronic document representation is processed to generate an image representative of a state of the application at the time corresponding to the post. The image or a representation thereof is caused to be displayed in the post to reflect the state of the application at selected point along a timeline defined by the conversation.

Electronic document representation of a user interface can include markup language representations and DOMs (Document Object Models) generated from markup language representations or any other electronic document containing content that when processed can be used to cause a display of a user interface. In an example, the application may be a web or a cloud application. A client interacts with the application by sending request. Responses to those requests can include a markup language document that is processed and displayed. In processing the markup language document, the client may generate a DOM which serves as an API (application programming interface) providing a structural representation of the markup language document allowing its content and visual presentation to be modified using a scripting language. Here, the clients can save the markup language or DOM document for later use in generating the image for inclusion in the conversation post. This image, for example, can be generated by using an HTML canvas element. The canvas element is a container for graphics drawn by a script processing the electronic document representation. The script, for example, produce an image that includes all elements of the electronic document representation, or the script may take, as input, identifiers for selected elements. A DOM organizes the elements of a user interface (from the markup language document), in a hierarchical tree structure allowing particular elements to be selected and used by the script in generating the image.

The following description is broken into sections. The first, labeled "Illustrative Examples," presents examples of application states being captured in a conversation. The second section, labeled "Environment," describes an example environment in which various embodiments may be implemented. The third section, labeled "Components," describes examples of various physical and logical components for implementing various embodiments. The fourth section, labeled as "Operation," describes steps taken to implement various embodiments.

Illustrative Examples

Figure 2:
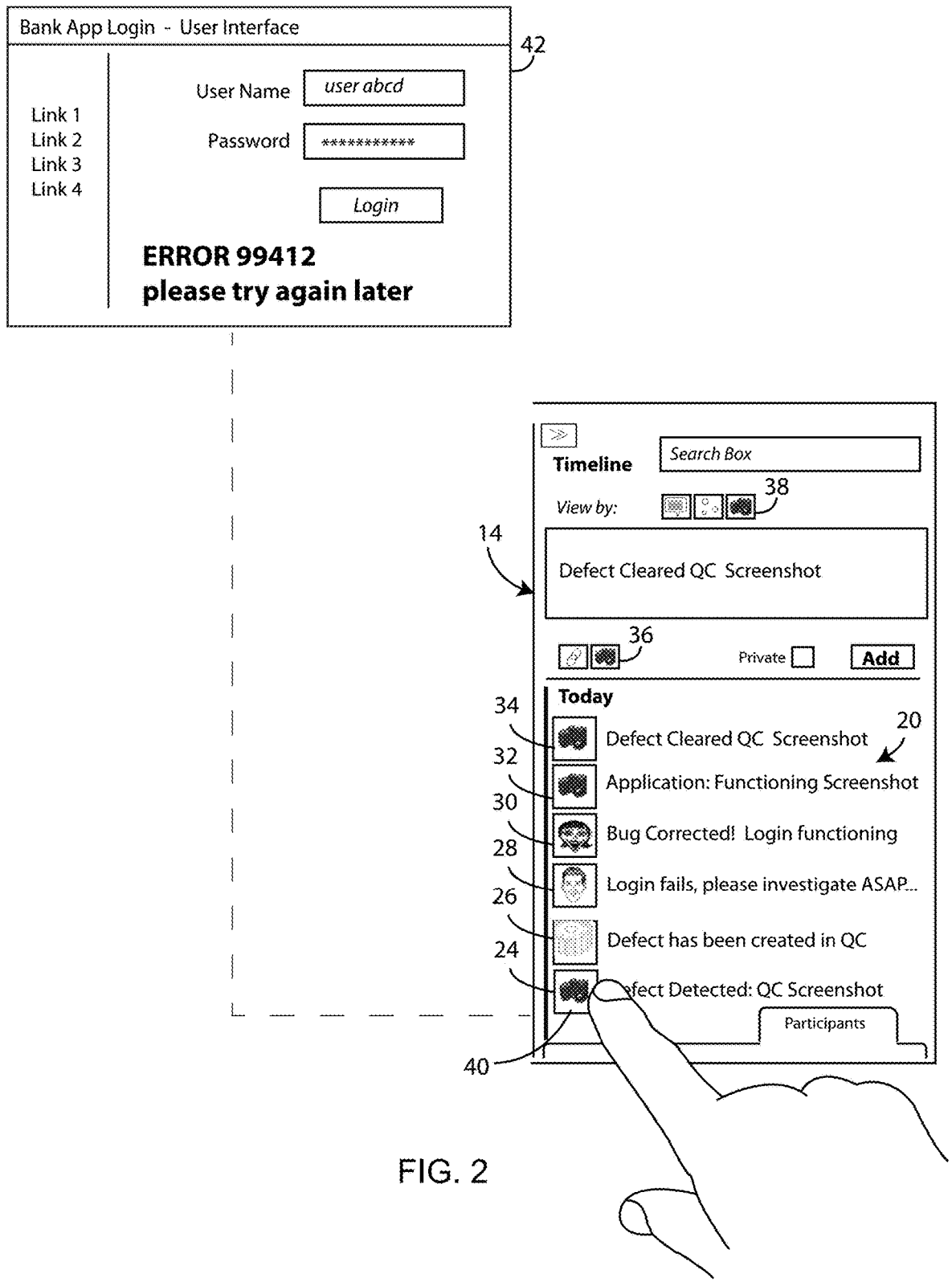
Figure 3:
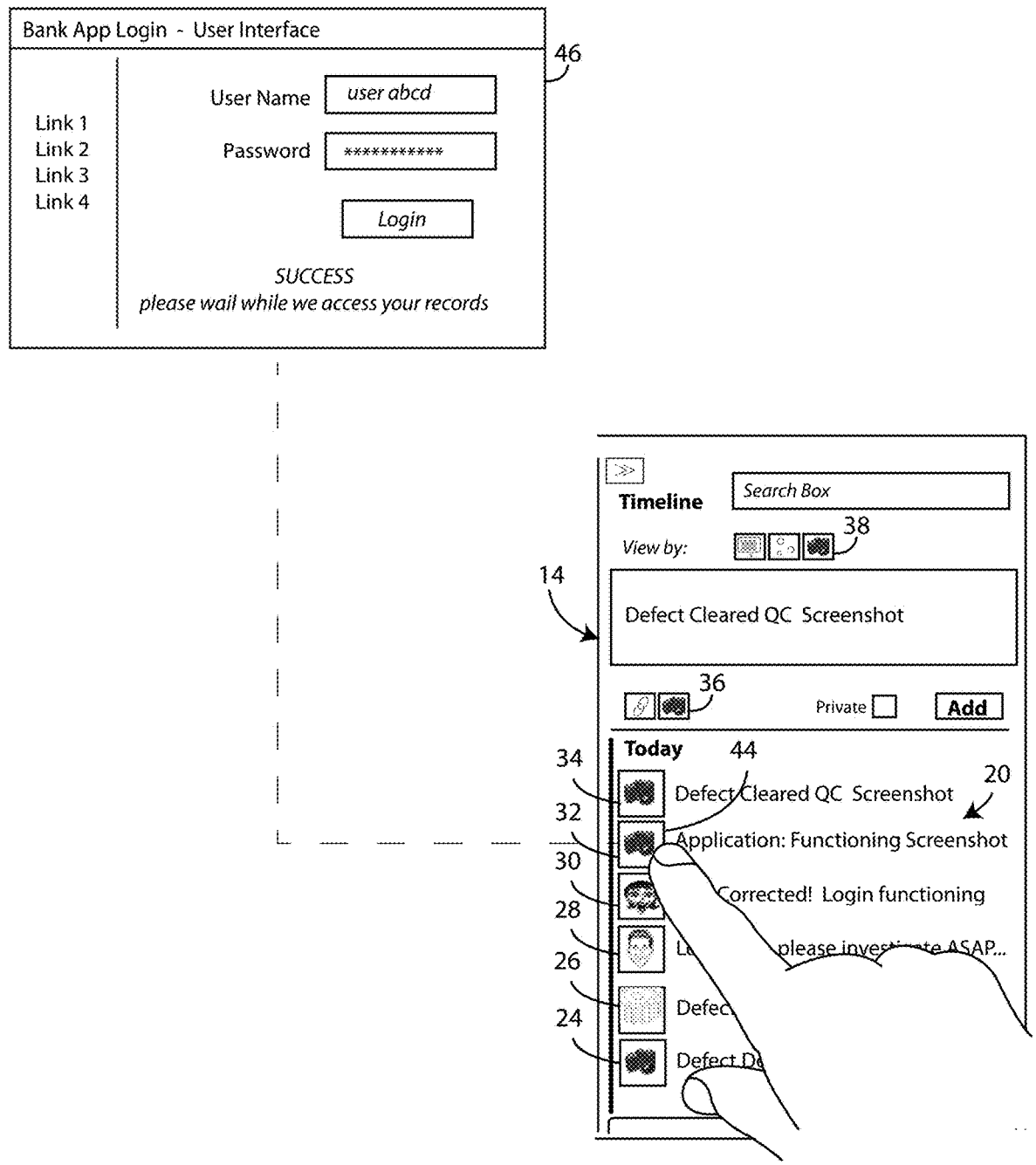
Figure 4:
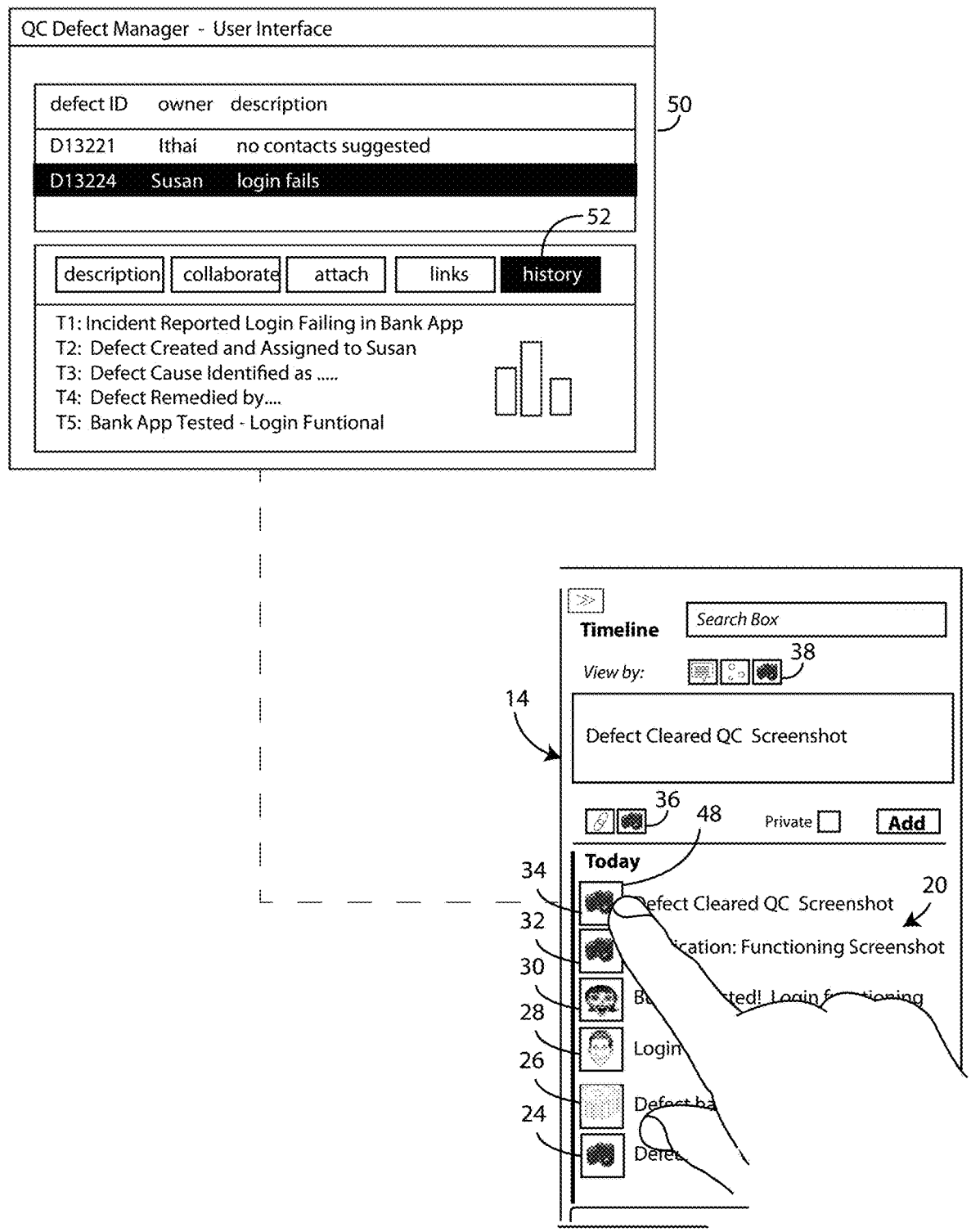

FIGS. 1-4 depict an example where application states are captured in a conversation. FIG. 1 depicts sample conversation made up of posts along a timeline. FIGS. 2-4 each depict an example of how an application state can be captured in a post to that conversation. Starting with FIG. 1, user interface 10 is of a collaboration tool and is divided into three main sections 12, 14, and 16. Section 12 provides an area to display a list of collaborations. Each collaboration can involve a different topic and can include different participants. In FIG. 1, collaboration 18 is selected. Collaboration 18 relates to an application bug being tracked by a defect management tool provided by an application identified as "Quality Center." The conversation can be said to be associated with the Quality Center application as well as the application suffering from the defect referred to here as "Banking App." The conversation may be associated with the Banking App via an application testing tool used to identify the defect. As will be expanded on below, the various states of the defect and the Banking App as reported by the defect management tool and the testing tool can be captured.

As a result of selecting collaboration 18, collaboration content for collaboration 18 is displayed in sections 14 and 16. That collaboration content includes a collaboration timeline 20 displayed in section 14 and facet 22 of the bug reporting tool in section 16. Collaboration timeline 20 as shown has grown over time to include posts 24-34. Posts 24-34 of conversation 18 can be said to define timeline 20. Here timeline 20 starts with post 24 and ends with post 34. As depicted, timeline 20 includes posts 24, 32, and 34 each corresponding to a different screenshot of a given application. Here, posts 24 and 32 correspond to screenshots capturing the state of Banking App as reported by the testing tool at different points along timeline 20. Post 34 corresponds to a screenshot capturing a state of the defect tracking tool at another point along collaboration timeline 20.

The term screenshot here refers to an image generated by processing an electronic document representation of the user interface for the defect management tool for post 34 and an electronic document representation of the user interface for the testing tool for posts 24 and 32. The electronic document representation may be obtained for or generated from data obtained from the respective applications. Such data may be maintained by or otherwise accessible from the device displaying interface 10. For example, the conversation here is associated with a particular application defect that can be distinguished using an identifier within the defect management tool. That defect in turn can be associated with a particular test within the test tool. Thus by using the identifier for the defect, the electronic document models can be identified on the client or requested for the respective tools.

The images, for example, can be generated in response to a capture event. The capture event may be triggered by a user selecting a control such as control 36, or it may be triggered by another event such as, in FIG. 1, the creation or closing of a defect in the defect management tool. A capture event may lead to generating a single image capturing the states of one or more applications. A capture event may lead to generating multiple images capturing the states of multiple applications. In the example of FIG. 1, the closing of the defect in the defect management tool may have served as a capture event for generating an image capturing the state of the Banking App for post 32 and another image capturing the state of the defect management tool for post 34.

The image itself can be included in a given post. However, in the example of FIG. 1, representations of such images are included in posts 24, 32, and 34 in the form of links 40, 42, and 44 shown in FIGS. 2-4 respectively. In FIG. 2, a user has selected link 40 of post 24 causing a pop-up display of image 42. Here image 42 captures a state of the Banking App captured through the testing tool and indicates an unexpected login error. In FIG. 3, the user has selected link 44 of post 32 causing a pop-up display of image 46. Here image 46 captures a later state of the Banking App captured through the testing tool. That state indicates a successful log-in. Finally, in FIG. 4, the user has selected link 48 causing a pop-up display of image 50. Image 50 captures a state of the defect management tool showing a history of the defect.

Figure 5:
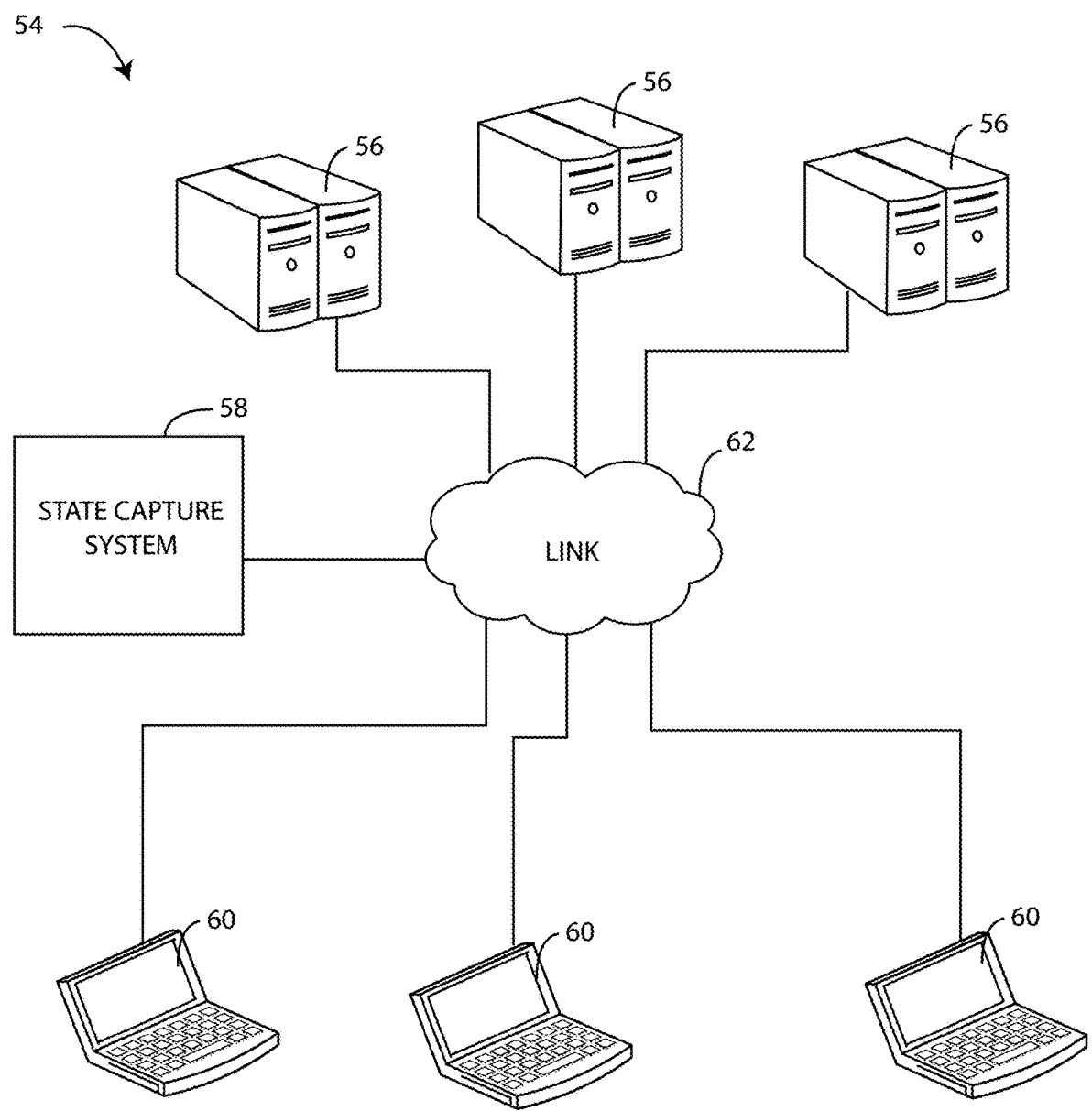
FIG. 5 depicts an example environment in which various embodiments may be implemented.

Environment:

FIG. 5 depicts an environment 54 in which various embodiments may be implemented. Environment 54 is shown to include application services 56, state capture system 58, and client devices 60. Application services 56 each represent a computing device or combination of computing devices configured to serve an application to client devices 60. Examples can include enterprise and consumer web and cloud applications provided through service oriented architectures.

State capture system 58 represents a computing device or combination of computing devices configured to capture the state of an application in a conversation associated with that application. System 58 is described in more detail below with respect to FIGS. 6 and 7, but in general system 58 is configured to generate an image reflecting the state of that application and then cause that image or a representation thereof to be included in a post to that conversation. That post then is reflective of the application state at a given point along a timeline defined by post to that conversation.

Client devices 60 each represent a computing device configured to interact with application services 56 and state capture system 58. Such interaction may be through a browser or other application executing on a given client device 60. The applications can include the applications that are the subject of a conversation as well as a collaboration tool for managing the conversation. Link 40 represents generally one or more of a cable, wireless, fiber optic, or remote connections via a telecommunication link, an infrared link, a radio frequency link, or any other connectors or systems that provide electronic communication. Link 40 may include, at least in part, an intranet, the Internet, or a combination of both. Link 40 may also include intermediate proxies, routers, switches, load balancers, and the like.

Figure 6:
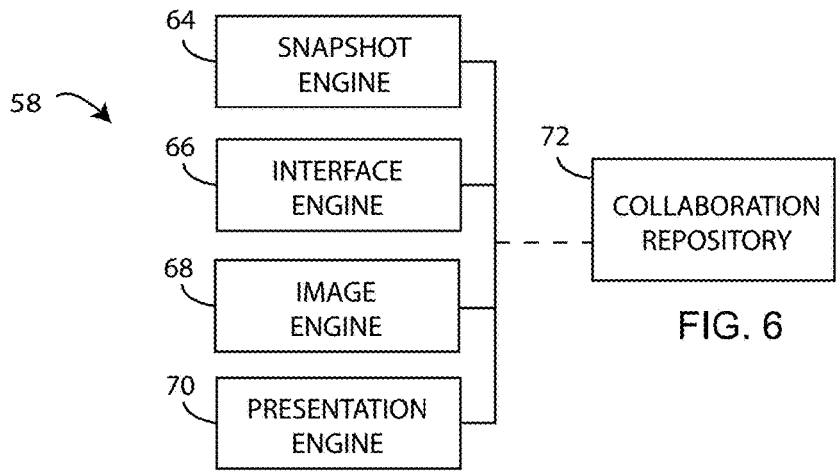
FIGS. 6 and 7 depict a system according to an example.

Components:

FIG. 6 depicts components of system 58 for capturing an application state in a conversation. In FIG. 6 various components are identified as engines 64-70. In describing engines 64-70, focus will be on each engine's designated function. However, the term engine, as used herein, refers to a combination of hardware and programming configured to perform a designated function. As is illustrated later with respect to FIG. 7, the hardware of each engine, for example, may include a processor and a memory, while the programming is code stored on that memory and executable by the processor to perform the designated function.

In the example of FIG. 6 system 58 includes snapshot engine 64, interface engine 66, image engine 68, and presentation engine 70. Snapshot engine 64 is configured to detect a snapshot event with respect to a conversation associated with an application. A snapshot event is an event indicating a time at which the state of an application is to be captured in the conversation. A snapshot event can be triggered manually by a user interacting with a user interface control such as control 36 of FIGS. 1-4. A capture event may be triggered based on the occurrence of another event. For example, where a conversation is associated with item being managed by an application, a change in status of that item may trigger the capture event. Referring to FIGS. 1-4, a change in status of the defect being managed by the defect management tool may trigger a capture event.

Interface engine 66 is configured to, in response to the snapshot engine 66 detecting a snapshot event, access an electronic document representation of the application's user interface. Again, the application is an application associated with the conversation. The electronic document representation can be accessed in a number of fashions. Where the representation is a markup language representation or a DOM created from that markup language document, the representation may be maintained locally by a client device used to interact with the associated application. In another example, the conversation is known to be associated with a given application and perhaps a particular item managed by that application. Interface engine 66 may communicate a request (that, if available, identifies the application object) to the application. The application may then return a markup language representation of a current user interface that can be processed to create a DOM.

Image engine 68 is configured to generate an image corresponding to visual characteristics of selected elements identified from the electronic document representation. The generated image is thus representative of a state of the application at the time of the snapshot event. The selected elements identified may be all the elements of the electronic document representation that can be used to generate the image. Alternatively, the particular elements may be selected to include only those relevant to the application object in question or those otherwise relevant to the context of the conversation. Such a selection can be made based on the nature of a capture event. For example, if the capture event is triggered by the closing of a defect in a defect management tool, the selected elements may include a history that would describe how the defect was cured. Image engine 68 may, for example, utilize an HTML canvas element to generate the image. In such a case, image engine 68 may include a script to define the content of the container defined by the canvas element. That script would utilize the selected elements from the electronic document representation.

Presentation engine 70 is configured to cause the image or a representation thereof to be displayed in a post to the conversation to reflect the state of the associated application at selected point along a timeline defined by the conversation. The resulting post can include the image alone or it may also include descriptive text. The resulting post can include the representation alone or the representation along with the descriptive text. The representation is a link that when selected causes a display of the image. The link may be generic or a thumbnail of the image it represents.

The conversation can include multiple posts in which the state of an associated image is captured. Thus, the conversation can be used to depict the evolving state of the application along a timeline. Where, for example, a conversation in on the topic of correcting an IT problem with respect to a given application, the conversation can be read later to learn if the solution reached might help with another problem. In this case, snapshot engine 64 would detect two snapshot events separated in time. Following the first snapshot event, engines 66-70 would perform their respective functions resulting in a first image being included in a first post. Following the second snapshot event, engines 66-70 would perform their respective functions again resulting in a second image being included in a second post. Assuming the state of the application had changed between snapshot events, the resulting images will differ and reflect the differing states As noted with respect to the examples of FIGS. 1-4, a conversation may be associated with multiple applications. Thus different posts to that conversation can include images or representations of images capturing the states for the different applications. Further, a single post can include one or more images or representations thereof capturing the states of the different applications. Here, the electronic document representation may be single DOM that represents user interfaces of the different applications allowing image engine 68 to process that DOM to generate the one or more images.

In foregoing discussion, various components were described as combinations of hardware and programming. Such components may be implemented in a number of fashions. Looking at FIG. 7, the programming may be processor executable instructions stored on tangible, non-transitory memory resource 74 and the hardware may include processing resource 76 for executing those instructions. Thus memory resource 74 can be said to store program instructions that when executed by processing resource 76 implement system 58 of FIG. 6.

Memory resource 74 represents generally any number of memory components capable of storing instructions that can be executed by processing resource. Such memory components being non-transitory computer readable media. Memory resource 74 may be integrated in a single device or distributed across devices. Likewise processing resource 76 represents any number of processors capable of executing instructions stored by memory resource. Processing resource 76 may be integrated in a single device or distributed across devices. Further, memory resource 74 may be fully or partially integrated in the same device as processing resource 76 or it may be separate but accessible to that device and processing resource 76. Thus, it is noted that system 58 may be implemented on a user or client device, on a server device or collection of servicer devices, or on a combination of the user device and the server device or devices.

In one example, the program instructions can be part of an installation package that when installed can be executed by processing resource 76 to implement system 58. In this case, memory resource 74 may be a portable medium such as a CD, DVD, or flash drive or a memory maintained by a server from which the installation package can be downloaded and installed. In another example, the program instructions may be part of an application or applications already installed. Here, memory resource 74 can include integrated memory such as a hard drive, solid state drive, or the like.

Figure 7:
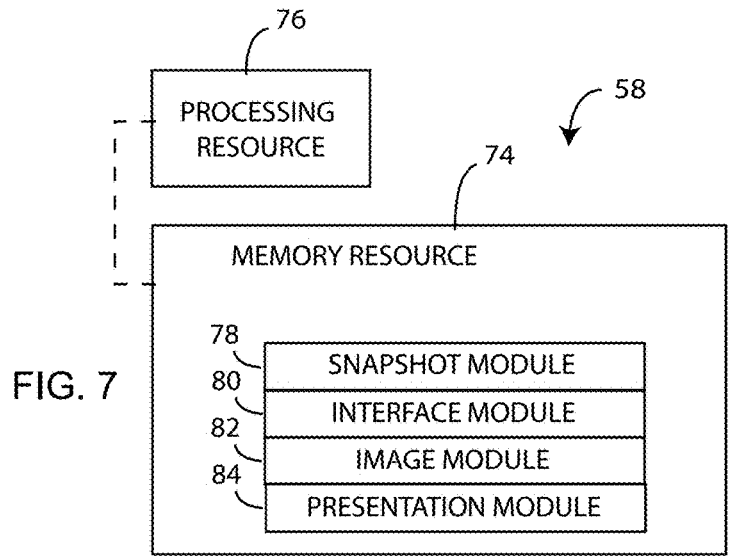

In FIG. 7, the executable program instructions stored in memory resource 74 are depicted as snapshot module 78, interface module 80, image module 82, and presentation module 94. Snapshot module 78 represents program instructions that, when executed, cause processing resource 76 to implement snapshot engine 64 of FIG. 6. Interface module 80 represents program instructions that when executed cause the implementation of interface engine 66. Likewise, image module 82 and presentation module represent program instructions that when executed cause the implementation of image engine 69 and presentation engine 70, respectively.

Figure 8:
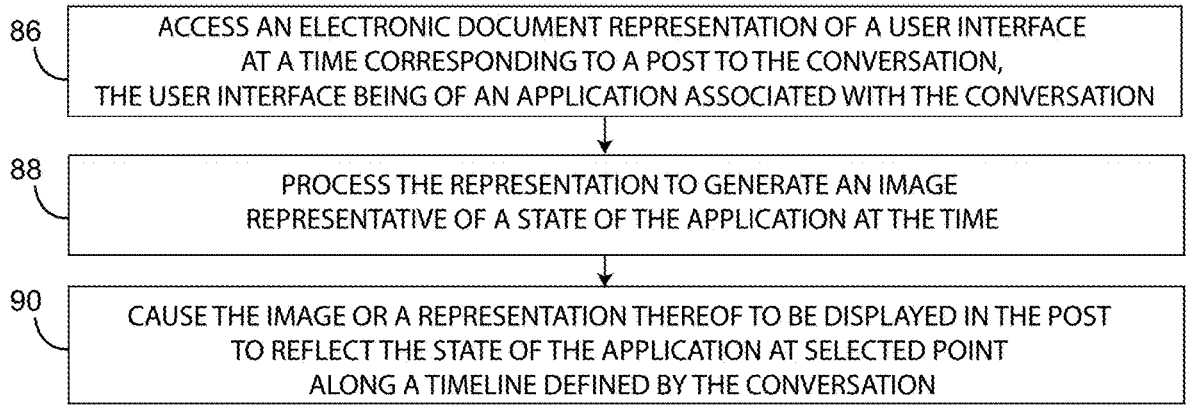
FIG. 8 is a flow diagram depicting steps taken to implement an example.

Operation:

FIG. 8 is a flow diagram of steps taken to implement a method for capturing an application state in a conversation. In discussing FIG. 8, reference may be made to the diagrams of FIGS. 1-7 to provide contextual examples. Implementation, however, is not limited to those examples.

An electronic document representation of a user interface is accessed at a time corresponding to a post to the conversation (step 86). The user interface is of an application associated with the conversation. As explained above, such a representation may be a markup language representation or a DOM generated from the markup language representation. The representation may be maintained by a client or obtained from the application. Referring to FIG. 6, interface engine 66 may be responsible for implementing step 86 while interface module 80 of FIG. 7 represents the program instructions for doing so.

The representation is processed to generate an image representative of a state of the application at the time (step 88). Step 88 may be accomplished by identifying desired elements of the user interface. The representation can be examined to identify visual characteristics of the desired elements where those characteristics are illustrative of the state of the application. The image is then generated according to those characteristics. The desired elements may be default elements, elements identified by a user, or elements selected automatically based on the nature of a capture event that triggered step 86. Referring again to FIGS. 6 and 7, Image engine 68 may be responsible for implementing step 88 while image module 82 represents the program instructions for doing so.

The image or a representation thereof is caused to be displayed in the post to reflect the state of the application at selected point along a timeline defined by the conversation (step 90). Referring again to FIGS. 6 and 7, presentation engine 70 may be responsible for implementing step 90 while presentation module 84 represents the program instructions for doing so.

CONCLUSION

FIGS. 1-4 depict examples of a user interface 10 in which an application state is captured in a conversation. The particular layouts and designs of user interface 10 depicted in FIGS. 1-4 are examples only. FIGS. 5-7 aid in depicting the architecture, functionality, and operation of various embodiments. In particular, FIGS. 5-7 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any non-transitory media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagram of FIG. 8 shows a specific order of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A system comprising a processing resource and a non-transitory memory resource storing instructions for:
   a collaboration tool, executable by the processing resource, that captures an application state in a conversation managed by the collaboration tool;
   a snapshot engine, executable by the processing resource, that enables capturing states of a plurality of applications other than the collaboration tool managing the conversation, wherein the states of the plurality of applications are captured in the conversation via an electronic document representation of user interfaces of the plurality of applications, the electronic document representation being captured by a capture event triggered in response to a change of status of an item within at least one of the plurality of applications;
   an interface module, executable by the processing resource, that accesses the electronic document representation at a time corresponding to a post to the conversation regarding the item;
   an image module, executable by the processing resource, that processes the electronic document representation to generate images representative of the states of the plurality of applications at the time; and
   a presentation module, executable by the processing resource, that causes the images or a representation thereof to be displayed in the post to reflect the states of the plurality of applications at a selected point along a timeline defined by the conversation.

2. The system of claim 1, wherein the image module:
   identifies desired elements of the user interfaces;
   examines the electronic document representation to identify visual characteristics of the desired elements, the visual characteristics being illustrative of the states of the plurality of applications; and
   generates the image according to those characteristics.

3. The system of claim 1, wherein the electronic document representation is one of a markup language document representation and a DOM (document object model) representation.

4. The system of claim 1, wherein:
   the electronic document representation includes electronic document representations of the user interfaces of the plurality of applications;
   the image module, processes the electronic document representations to generate one or more images representative of states of the plurality of applications at the time; and
   the presentation module, causes the images or the electronic document representations thereof to be displayed in the post that reflects the states of the plurality of applications at selected points along the timeline defined by the conversation.

5. The system of claim 1, wherein:
   the memory resource stores a snapshot module, executable by the processing resource, that detects a snapshot event instigated via a user interface depicting the conversation and not the user interface of an associated application of the plurality of applications, and
   the time coincides with the snapshot event.

6. The system of claim 1, wherein:
   the electronic document representation is a first electronic document representation, the states includes a first state, and the image is a first image of an associated application of the plurality of applications;
   the interface module accesses a second electronic document representation of the user interface at a second time, the second time corresponding to a second post to the conversation,
   the image module processes the second electronic document representation to generate a second image representative of a second state of the associated application at the second time;
   the presentation module causes the second image or a representation thereof to be displayed in the second post to reflect the second state of the associated application such that the conversation includes a plurality of posts depicting changing states of the associated application along the timeline.

7. A non-transitory computer readable medium having instructions that when executed trigger a processor to:

enable capturing respective states of a plurality of applications other than a collaboration application in a conversation regarding the plurality of applications wherein the conversation is managed by the collaboration application, the states of the plurality of applications being captured via an electronic document representation of user interfaces of the plurality of applications, the electronic document representation being captured by a capture event triggered in response to a change of status of an item within at least one of the plurality of applications;

examine, in response to a snapshot event, the electronic document representation of the user interfaces of the plurality of applications to identify visual characteristics of selected elements;

generate digital images according to the identified characteristics; and cause the digital images or representations thereof to be displayed in a post to a conversation associated with the item at a selected point along a timeline defined by the conversation, the digital images reflecting the states of the plurality of applications at the time of the capture event.

8. The medium of claim 7 wherein the electronic document is one of a markup language document representation or a DOM (document object model) representation.

9. The medium of claim 7, wherein the instructions that trigger the processor to cause the digital images to be displayed include instructions that when executed trigger the processor to:

cause the one or more digital images or representations thereof to be displayed in the post to the conversation associated with the plurality of applications, the one or more digital images reflecting the states of the plurality of applications at the time of the capture event.

10. A system comprising a processor and a non-transitory memory, the memory storing code executable by the processor, the code including a collaboration application, a snapshot engine, an interface engine, an image engine, and a presentation engine, wherein:

the snapshot engine captures respective states of a plurality of applications other than the collaboration application, in a conversation managed by the collaboration application, the respective states are captured via an electronic document representation of user interfaces of the plurality of applications, the electronic document representation being captured by a capture event triggered in response to a change of status of at least one item within the plurality of applications;

the interface engine, in response to the snapshot engine detecting a snapshot event, accesses the electronic document representation of the user interfaces of the plurality of applications;

the image engine generates images corresponding to visual characteristics of selected elements identified from the electronic document representation, the images representative of the respective states of the plurality of applications at a time of the snapshot event; and the presentation engine causes the image or the electronic document representation thereof to be displayed in a post to the conversation to reflect the respective states of the plurality of applications at a selected point along a timeline defined by the conversation.

11. The system of claim 10, wherein:

the conversation is associated with the plurality of applications;

the interface engine, in response to the snapshot engine detecting a snapshot event, accesses the electronic document representation of the user interfaces of the plurality of applications;

the image engine generates one or more digital images corresponding to visual characteristics of selected elements identified from the electronic document representation, the one or more digital images representative of the states of the plurality of applications at a time of the snapshot event; and the presentation engine causes the one or more digital images or representations thereof to be displayed in the post to the conversation to reflect the states of the plurality of applications at selected points along the timeline defined by the conversation.

12. The system of claim 1, wherein the image or the representation thereof corresponds to and is adjacent to the post but does not correspond to and is not adjacent to other posts in the conversation.

13. The system of claim 10, wherein the image or the representation thereof corresponds to and is adjacent to the post but does not correspond to and is not adjacent to other posts in the conversation.

14. The system of claim 1, wherein the snapshot engine when executed:

detects the capture event indicating a time at which the states of the plurality of applications are to be captured, the time at which the states of the plurality of applications are to be captured corresponding to the time at which the post regarding the item is made to the conversation.

15. The system of claim 4, wherein the item is distinguishable by an identifier that enables identifying the electronic document representations of the plurality of applications.

16. The system of claim 4 wherein a single DOM is used for the electronic document representations of the plurality of applications.

17. The system of claim 4, wherein the plurality of applications include at least a defect tracking tool that tracks defects in the application state.

* * * * *